United States Patent
Neubeck, Jr. et al.

[11] 3,738,554
[45] June 12, 1973

[54] CONTINUOUS AUTOMATIC FRANKFURTER UNLOADER
[75] Inventors: W. H. Neubeck, Jr., Chicago; Anthony J. Kloska, Chicago Heights, both of Ill.
[73] Assignee: The Griffith Laboratories, Inc., Chicago, Ill.
[22] Filed: June 30, 1972
[21] Appl. No.: 268,151

[52] U.S. Cl.................... 226/104, 198/177, 226/5
[51] Int. Cl............................................. B65h 17/42
[58] Field of Search...................... 226/5, 104–107; 198/177

[56] References Cited
UNITED STATES PATENTS
3,204,844  9/1965  Wallace ...................... 198/177 R X
3,533,495  10/1970  Wallace ...................... 198/177 R X Primary Examiner—Richard A. Schacher
Attorney—Charles J. Merriam, William A. Marshall, Jerome B. Klose et al.

[57] ABSTRACT

Apparatus for unloading festoons of tubed edible material, such as sausage, depending from hangers moving along a predetermined path. The apparatus includes a dislodger, responsive to the movement of the hangers, which urges the festoons of sausage laterally off of the hangers.

8 Claims, 4 Drawing Figures

Patented June 12, 1973

CONTINUOUS AUTOMATIC FRANKFURTER UNLOADER

BACKGROUND OF THE INVENTION

The present invention relates generally to apparatus for unloading tubed edible material from hangers or the like. More particularly, the invention relates to apparatus for unloading festoons of cooked comminuted meat product such as frankfurters or sausages.

Present-day sausage manufacturing operations have become increasingly automated. A modern processing plant will have automatic machinery for grinding or comminuting the meat and mixing it with other ingredients, as well as automatic apparatus for inserting the meat emulsion into casings and forming sausage links. After the product has been inserted into a casing, the uncooked sausage is conveyed to an oven area for cooking, then to an unloading area, and finally to a packaging area. These latter operations are likewise automated with conveyors moving the tubed sausage from one location to the next.

One popular type of sausage product is the skinless frankfurter. Casings for skinless sausages or frankfurters are formed from an inedible plastic material or cellophane rather than from an edible material such as gut. A meat emulsion is fed into a continuous tube of this plastic material. The casing serves both to shape the meat product in a tubular form and to contain it during the cooking operation. The casing is usually removed by peeling after the cooking stage, prior to packaging.

One method of skinless sausage manufacture comprises stuffing the plastic casing with meat emulsion, crimping the stuffed casing to form links, hanging the stuffed casing in continuous loops or festoons from a plurality of hangers, and passing the uncooked sausage into ovens for a cooking operation. From the ovens, the cooked sausage is cooled, passed to a decasing or peeling apparatus, and finally conveyed to a packaging machine. Before the cooked frankfurters can enter into the peeling and packaging stages, however, the festooned sausages must be dislodged from the hangers onto a horizontal conveyor.

Because the cooking operation often results in an adherence of the plastic sausage casing to the hangers, the festooned sausage product may not be able to be merely dumped from the hangers. In such cases, the festoons must be physically propelled from the hanger in order to overcome this adhesion.

SUMMARY OF THE INVENTION

The present invention provides an automatic apparatus for dislodging festooned sausage from hangers onto a surface below. The dislodged sausage can then be conveyed to locations where the subsequent peeling and packaging operations can be effected.

The cooked sausage is urged from the hangers by a pair of vertically disposed push plates arranged to open and close like the front and back covers of a book. These plates, when activated by a switch, are rapidly pivoted and strike one or more festoons of sausages, urging them in an outward, lateral direction, off of the ends of the hangers. The plates then return to a normally closed position until the switch is again tripped.

Other features and advantages are inherent in the apparatus claimed and disclosed herein, or will become apparent to those skilled in the art from the following detailed description in conjunction with the accompanying diagrammatic drawings.

DETAILED DESCRIPTION OF THE INVENTION

Figure 1:
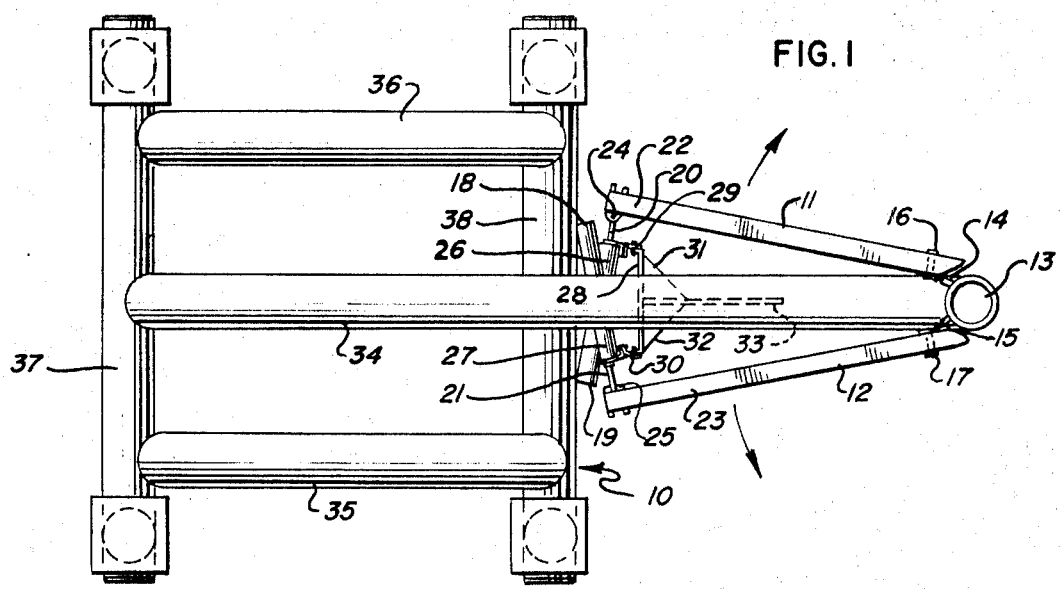
FIG. 1 is a plan view, taken on line 1—1 of FIG. 2, showing an embodiment of unloading apparatus in accordance with the present invention, with some parts removed.
Figure 2:
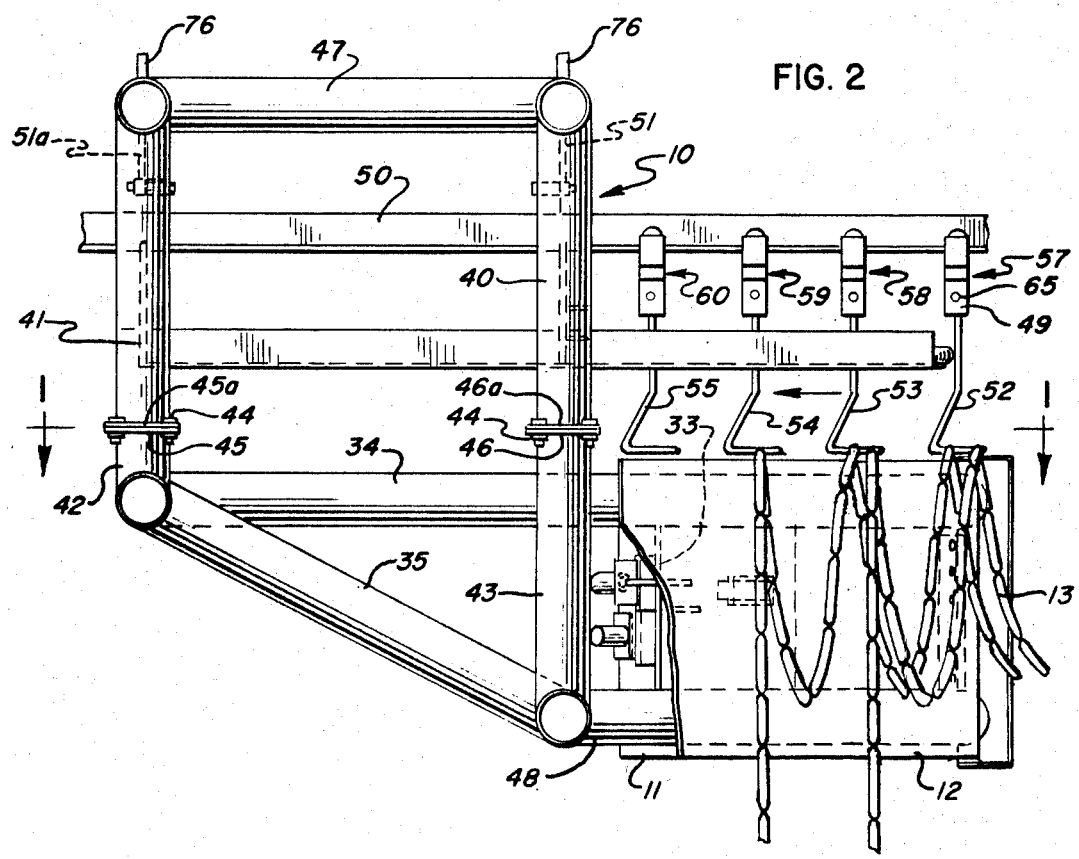
FIG. 2 is a side elevational view of the unloading apparatus, partially in section.

FIGS. 1 and 2 show an unloading apparatus 10 having a pair of dislodging means or push plates 11, 12 in a first, normally closed, position. Push plates 11, 12 are pivotally mounted on vertical support tube 13 by hinges 14, 15 and plate bolts 16, 17.

Pneumatic actuators 18, 19 have pistons 20, 21 each pivotally mounted, respectively, to push plate ends 22, 23 by connectors 24, 25 and cylinders 26, 27 attached to bracket 28 by fastening means 29, 30. Bracket 28 is supported by gussets 31, 32 attached to a spacer plate 33 which is itself fastened to and extends downwardly from an intermediate longitudinal tube 34 (FIG. 2).

Figure 3:
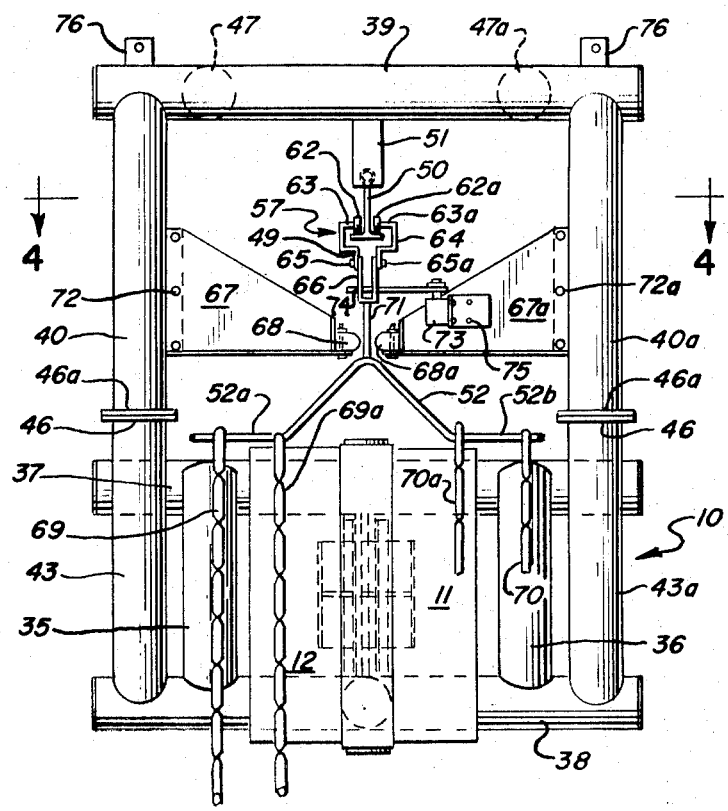
FIG. 3 is an end elevational view of the apparatus of FIG. 2.

Referring now to FIGS. 1-3, unloading apparatus 10 has a vertical support structure comprising a pair of bottom vertical rear tubes 42, 42a (latter not shown) and a pair of bottom vertical front tubes 43, 43a, each joined respectively to rear top vertical tubes 41, 41a (latter now shown) and front top vertical tubes 40, 40a by tube fasteners 44 at flanged end portions 45, 45a, 46, 46a. Further supporting structure is provided by diagonal tubes 35, 36 each of whose ends are connected both to an intermediate cross tube 37 and a bottom cross tube 38 by welding or other conventional fastening means. Intermediate longitudinal tube 34 is welded at one end to vertical support tube 13 and at its other end to intermediate cross tube 37.

A pair of top cross tubes 39, 39a (FIG. 3; latter not shown) are joined, respectively, to top vertical tubes 40, 40a, 41, 41a. A pair of top longitudinal tubes 47, 47a are joined to top cross tubes 39, 39a. A bottom longitudinal tube 48 and bottom vertical rear tubes 43, 43a are attached to bottom cross tube 38, completing the apparatus support structure.

As illustrated in FIGS. 2-3, unloading apparatus 10 is suspended from supports, not shown, by hanger clips 76 on top cross tubes 39, 39a.

Figure 4:
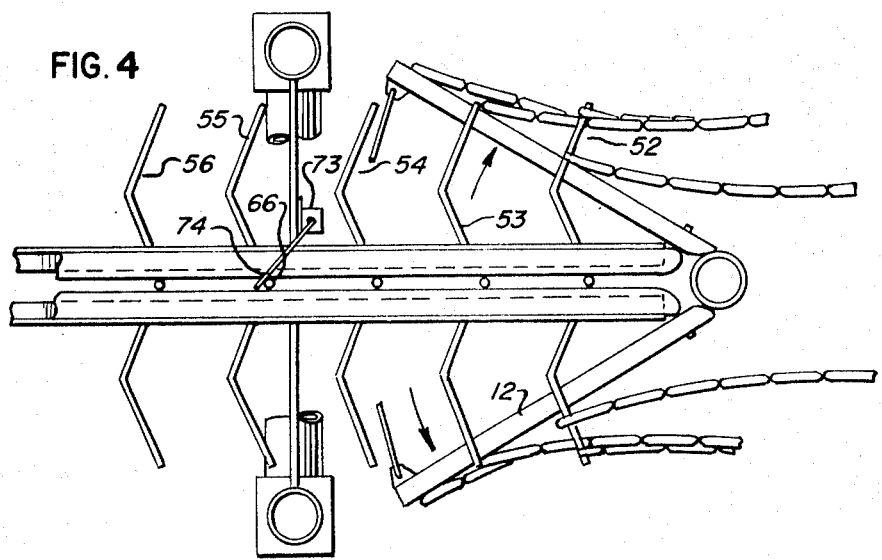
FIG. 4 is a plan view, taken along line 4—4 of FIG. 3, but at a later stage of operation of the apparatus.

Referring now to FIGS. 2-4, passing through unloading apparatus 10 is a path or conveyor rail 50, anchored to top cross tubes 39, 39a by rail clips 51, 51a. A plurality of hangers 52, 53, 54, 55, 56, having respective pairs of festoon hanging portions 52a, b, etc., are suspended from conveyor rail 50 by respective traveling assemblies 57, 58, 59, 60, 61 (last not shown), each of which has a pair of wheels 62, 62a and a pair of axles 63, 63a on an assembly top portion 64. A pair of bolts and nuts 65, 65a join assembly bottom portion 49 to hanger top portion 66. Traveling assemblies 57, 58, 59, 60, 61 are substantially equidistant from one another and are moved along conveyor rail 50 by a conveyor cable (not shown).

FIG. 3 illustrates hanger 52, bearing frankfurter chains 69, 69a, 70, 70a, approaching unloading apparatus 10. A pair of plastic guides 68, 68a, attached, respectively, to guide brackets 67, 67a, cooperate with hanger intermediate portion 71 to ensure the proper attitude of hanger 52 with respect to push plates 11, 12. Guide brackets 67, 67a are themselves attached to rear top vertical tubes 40, 40a by conventional fasteners at 72, 72a, respectively. A pneumatic switch 73, having a switch actuator 74, normally urged to a closed position by biasing means not shown, is mounted on guide bracket 67a with switch bolts 75. Pneumatic switch 73 is interconnected with both a fluid supply (not shown) and with pneumatic tubes 18, 19 (FIG. 1).

Referring now to FIGS. 1–4, cooked frankfurter chains 69, 69a, 70, 70a, have been strung in festoons from hangers 52, 53, 54, 55, 56 and passed through ovens in earlier steps, not shown, and approach unloading apparatus 10 along conveyor rail 50 to be dislodged from the hangers. Hanger top portion 66 of hanger 55 engages and moves switch actuator 74 from its normally closed position (FIG. 4), opening pneumatic switch 73, thereby inducing pistons 20, 21 to extend from cylinders 26, 27 of pneumatic actuators 18, 19 causing push plates 11, 12 to pivotally fly apart quite rapidly and strike the festooned sausage. As hanger 55 continues its travel, hanger top portion 66 releases switch actuator 74 which returns to a normally closed position as do push plates 11, 12.

Each push plate 11, 12 has a substantial horizontal dimension in comparison to the horizontal spacing of traveling assemblies 57, 58, 59, 60, 61 on conveyor rail 50. Thus, push plates 11, 12, when actuated, strike several festooned frankfurter chains 69, 69a, 70, 70a on a plurality of hangers 52, 53, 54. This acts to dislodge the chains in stages: outermost frankfurter chains 69, 70 are generally dislodged at a hanger upstream position such as that of hanger 53 (FIG. 4), while innermost frankfurter chains 69a, 70a are removed at a downstream location such as that of hanger 54. The dislodged frankfurter chains 69, 69a, 70, 70a fall on horizontal conveyors (not shown) below apparatus 10 and are conveyed to subsequent processing locations.

The foregoing detailed description has been given for clearness of understanding only and no unnecessary limitations should be understood therefrom as modifications will be obvious to those skilled in the art.

What is claimed is:

1. In apparatus for unloading tubed edible material from a hanger moving along a predetermined path, the improvement comprising:
   dislodging means located along said path;
   means mounting said dislodging means for movement between first and second positions;
   means, responsive to movement of said hanger along said path, for moving said dislodging means from said first position to said second position;
   means on said dislodging means, responsive to movement of the dislodging means from said first position to said second position, for urging said edible material laterally off of said hanger; and
   means for returning said dislodging means to said first position.

2. Apparatus according to claim 1 wherein said dislodging means comprises a pair of push plate means.

3. Apparatus according to claim 2 wherein said pair of push plate means are pivotally mounted on a vertical support means.

4. Apparatus according to claim 1 wherein said means for moving said dislodging means from said first position to said second position comprises:
   switch means responsive to movement of said hanger;
   piston means interconnected to said switch means, said piston means, normally in a closed position, adjacent said dislodging means for moving said dislodging means between said first and second positions.

5. Apparatus for unloading tubed edible material transportable as festoons along a predetermined path, said apparatus comprising:
   a plurality of hangers for depending said edible material in said festoons between adjacent hangers;
   conveyor rail means including means for supporting said plurality of hangers laterally of said predetermined path and for transporting said hangers along said predetermined path;
   dislodging means located along said path;
   means mounting said dislodging means for movement between first and second positions;
   means, responsive to movement of said hangers along said path, for moving said dislodging means from said first position to said second position;
   means on said dislodging means, responsive to movement of the dislodging means from said first position to said second position, for urging said edible material laterally off of said hangers; and
   means for returning said dislodging means to said first position.

6. Apparatus according to claim 5 wherein said means for moving said dislodging means from said first position to said second position comprises:
   switch means responsive to movement of said hangers;
   piston means interconnected to said switch means, said piston means, normally in a closed position, adjacent said dislodging means for moving said dislodging means between said first and second positions.

7. Apparatus according to claim 6 wherein each of said hangers includes a hanger top portion for moving said switch means from a normally closed position.

8. Apparatus according to claim 5 wherein said hangers each includes a pair of edible material hanging portions;
   said edible material dependable in outer and inner festoons on at least one of said hanging portions; and
   means for repeatedly dislodgingly engaging said outer and inner festoons for urging said festoons from said hangers.

* * * * *